United States Patent
Driskell

[15] 3,698,102
[45] Oct. 17, 1972

[54] SUBMERGED PERISCOPE SIMULATOR
[72] Inventor: Carl R. Driskell, Winter Park, Fla.
[73] Assignee: The United States of America as represented by the Secretary of the Navy
[22] Filed: May 28, 1971
[21] Appl. No.: 147,918

[52] U.S. Cl. ..................................................35/25
[51] Int. Cl. ..............................................G09b 9/00
[58] Field of Search....................35/10, 11, 12 N, 25

[56] References Cited

UNITED STATES PATENTS

| | | | |
|---|---|---|---|
| 3,624,925 | 12/1971 | Herndon | 35/25 |
| 3,234,665 | 2/1966 | Sear et al. | 35/25 |
| 3,517,121 | 6/1970 | Petrocelli et al. | 35/25 X |
| 3,621,131 | 11/1971 | Wolff | 35/11 X |

Primary Examiner—Wm. H. Grieb
Attorney—Richard S. Sciascia, John W. Pease and John F. Miller

[57] ABSTRACT

An improvement to a periscope view simulator training device for training periscope operators. Comprises means for simulating the changing view obtained through a periscope when the periscope head is ascending from the darker ocean depths through lighter greenish colored waters near the surface and on to the daylight brightness of an above the surface position. Also simulates the view obtained when the periscope head descends from an above the ocean surface position down through the near-surface waters to the depths.

5 Claims, 2 Drawing Figures

PATENTED OCT 17 1972 3,698,102

INVENTOR
CARL R. DRISKELL
BY John F. Miller
AGENT
John M. Pear
ATTORNEY

SUBMERGED PERISCOPE SIMULATOR

BACKGROUND OF THE INVENTION

The invention is in the field of training devices. In U. S. Pat. Nos. 3,479,454 and 3,420,953 to Hanns H. Wolff is taught an electronic periscope view simulator useful for training periscope operating personnel, particularly submarine personnel. It has been discovered through experience in warfare that skill and dexterity in the manipulation of a submarine periscope and in quick and accurate observation during the time that the periscope is exposed above the sea surface is most important to submarine operations. The survival of submarine and crew in a combat situation is in fact dependent to a large degree on the skill of periscope operating personnel. Therefore many efforts have been made to simulate submarine-periscope operations in order to train personnel without incurring the hazards and expense of training at sea in actual submarines. The Wolff periscope view simulator, being all electronic, has proven to have many advantages over the opto-mechanical simulators of the prior art. However, the Wolff and other such simulators lack means for simulating the changing view observable as a periscope ascends to the surface, or dives. Applicant's invention overcomes this lack with simple and inexpensive apparatus, thus adding greatly to the versatility and utility of the simulator.

SUMMARY OF THE INVENTION

A greenish translucent cube is illuminated by a lamp having a variable voltage source to vary the illumination inversely with periscope depth. A solenoid operated mirror projects an image of the lighted green cube into the eyepiece of the simulator periscope. The field of view at the eyepiece is completely filled by the view of the cube. When the periscope head breaks the surface the solenoid operated mirror moves out of the optical path of the periscope and the usual surface view simulation is observable at the eyepiece. When the periscope goes beneath the surface a reverse procedure is initiated. Means are also provided to simulate the effect of waves washing over the periscope head when it is above the surface but below wave heights.

DESCRIPTION OF THE PREFERRED EMBODIMENT

Figure 1:
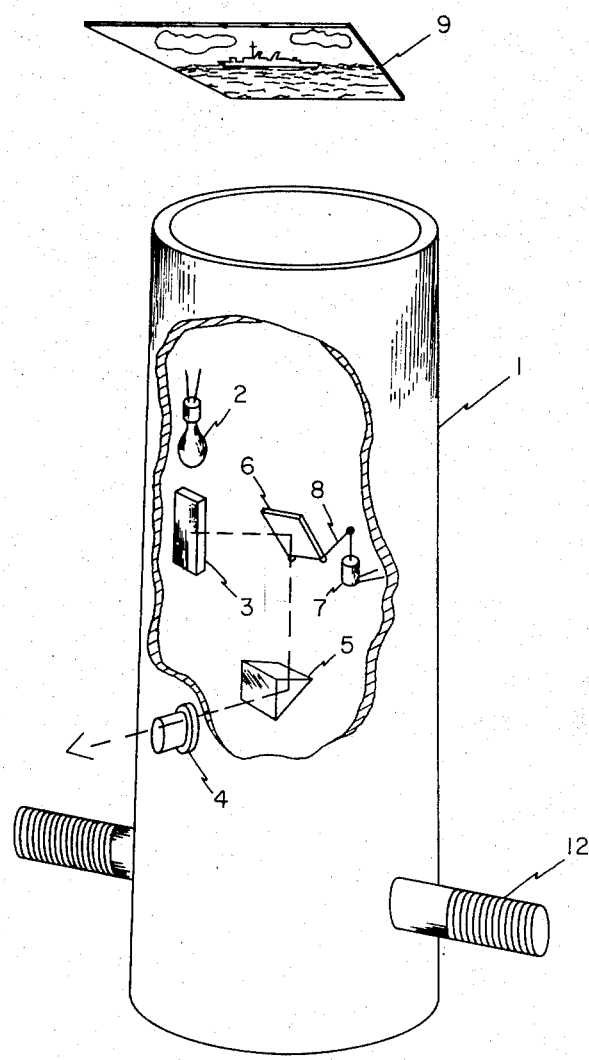
FIG. 1 illustrates the mechanical principles of the invention.

FIG. 1 shows a periscope tube 1 such as is found in periscope view simulators generally. The periscope has control handles 12, an eyepiece 4, and a prism 5 which bends the periscope optical path 90°. The view 9 represents a typical ocean surface view observable through eyepiece 4 when the periscope head projects above the sea surface. In the Wolff simulators the view 9 is synthesized electronically. Moving ships, planes, etc., may be seen to maneuver in the seascape shown in view 9.

The invention includes a variable light source such as a lamp 2, a greenish translucent or transparent cube 3, a hinged mirror 6 and a solenoid 7 which moves mirror 6 into or out of the periscope optical path by means of rod 8 on command. Light 2 and mirror 6 are controlled by the electronic components shown in FIG. 2.

When the viewing head (not shown) of periscope 1 is at a simulated depth so great that little light penetrates the ocean depths, mirror 6 is in the position shown in FIG. 1 and lamp 2 is extinguished. The view at eyepiece 4 is accordingly dark. As the periscope head ascends towards the surface the increasing light observable through a real periscope approaching the surface is simulated by gradually brightening lamp 2. This illuminates cube 3 which is observable at eyepiece 4 because of the position of mirror 6. Therefore the view at 4 gradually lightens, turning from dark to increasingly light greenish as the periscope depth decreases. Lamp 2 reaches maximum brightness just before the periscope surfaces. When the periscope head breaks the surface, solenoid 7 is activated to swing mirror 6 out of the optical path between eyepiece 4 and the scene on display 9 which represents an ocean view as seen from a surfaced periscope.

The effect of waves washing over the head of a surfaced periscope is simulated by supplying solenoid 7 with a continuously varying voltage which causes mirror 6 to swing into and out of the optical path. Lamp 2 is at maximum brilliance condition so that as mirror 6 continuously swings into and out of the optical path a view of scene 9 at eyepiece 4 is periodically obscured by the greenish colored view of cube 3, as though the observer were looking through a wave washing over the periscope head.

Figure 2:
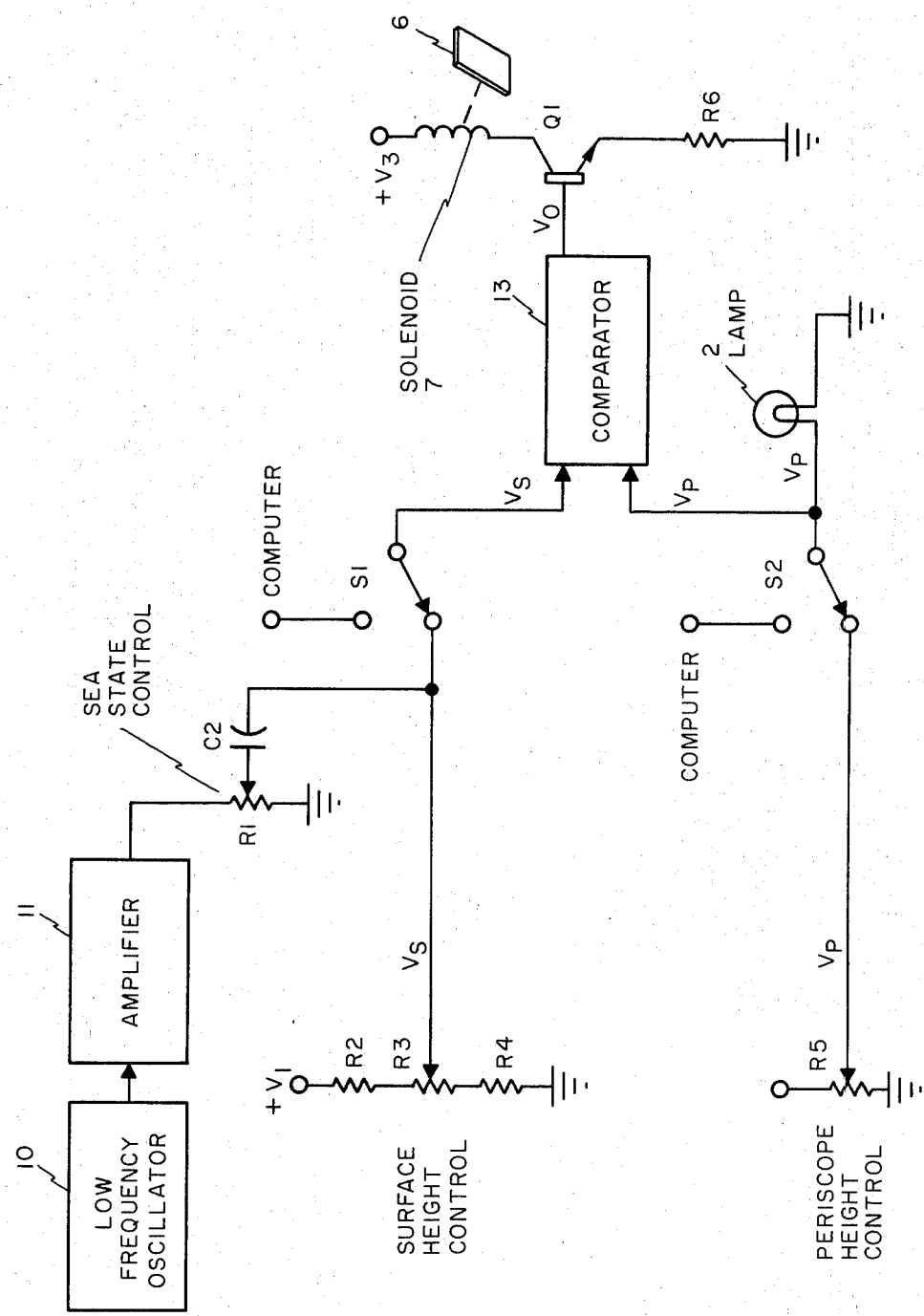
FIG. 2 is a combined block diagram and circuit schematic showing electronic components of the invention.

The control system for this invention is illustrated in FIG. 2. Here is shown the lamp 2, the mirror 6, the solenoid 7 and mechanical linkage 8 discussed in the explanation of FIG. 1.

A periscope height control R5 is shown in FIG. 2 for the purpose of illustration as a potentiometer supplied by a positive voltage source $V_2$. As periscope height control R5 is adjusted, a proportional output voltage $V_p$ from R5 is supplied to a comparator 13 and to lamp 2. The intensity of lamp 2 is proportional to the applied voltage $V_p$. A surface height control potentiometer R3 supplied by a voltage $V_1$ may be adjusted to a surface height level to develop a proportional output voltage $V_s$ which is supplied through a switch S1 to a second input of comparator 13.

The voltages $V_p$ and $V_s$ are compared in comparator 13. $V_s$ will have a value determined by the surface height selected and $V_p$ will have some value at or above a zero reference level at which no light reaches the periscope. If $V_s$ is greater than $V_p$, comparator 13 will develop a low output voltage $V_o$ which holds a transistor Q1 in a cutoff mode. The collector of transistor Q1 is supplied by voltage $V_3$ through solenoid 7. When Q1 is cut off, no current is permitted to flow through solenoid 7. Thus, mirror 6 is allowed to swing into the periscope optical path as described in the explanation of FIG. 1.

When the periscope height control R5 is such that the periscope is at or below the level at which no light reaches the periscope head window, the magnitude of $V_p$ passed to control the intensity of lamp 2 is such that cube 3 of FIG. 1 is not illuminated. As the periscope height is increased, $V_p$ will increase to gradually brighten the illumination of cube 3. As the periscope height control is adjusted upwards gradually to simulate an "up periscope" operation, $V_p$ progressively brightens lamp 2 and cube 3 until, when $V_p$ equals $V_s$, comparator 13 reverses its output voltage to furnish positive base drive to transistor Q1. This switches transistor Q1 to an on mode such that collector current is drawn through solenoid 7 which becomes energized to pull mirror 6 out of the periscope optical path. In this state, the normal surface scene of targets against a seascape background is presented to the periscope eyepiece.

Simulation of waves splashing over the periscope head window can be accomplished with a low frequency oscillator 10, an amplifier 11 and a sea state control R1 as shown in FIG. 2. Low frequency oscillator 10 generates a voltage waveform whose amplitude is indicative of the instantaneous height of the ocean waves. This low frequency waveform is fed through amplifier 11 to sea state control potentiometer R1. The amplitude of the waveform is adjusted by R1 in accordance with the desired sea state, the greater the amplitude, the greater or rougher the sea state. The voltage waveform is then fed from the wiper arm of R1 through capacitor C2 to the wiper arm of a voltage divider formed by potentiometer R3 and resistors R2 and R4. Resistors R2 and R4 are provided to prevent shorting of the low frequency waveform in the event that R3 is adjusted to either of its extremes.

When the periscope head window is near the surface in rough seas, the low frequency variation of the voltage coupled by capacitor C2 to the wiper arm of R3 will cause comparator 13 to change states which will result in a rhythmic switching of the mirror into and out of the optical path.

A random and perhaps more realistic variation in "wave height" voltage could be furnished with surface height information from a computer generated input through a switch S1 to comparator 13. The periscope height control voltage $V_p$ could also be computer generated and fed through switch S2 to comparator 13 and lamp 2.

The invention is simple and inexpensive, and can be fitted with relative ease to both existing and developmental periscope view simulators. It greatly enhances the effectiveness of any simulator by enabling trainees to practice a most essential operation, that is, raising the periscope, rapidly scanning the surface, and quickly lowering the periscope to avoid detection by enemy forces. This maneuver could be performed with prior art simulators but not with the realism necessary for truly effective training afforded by the invention.

What is claimed is:

1. In a periscope view simulator having a periscope, means for simulating a surface view of the sea through said periscope and periscope height control means, the improvement comprising:
   means for generating a variable brightness depth view through said periscope,
   means for varying said depth view connected to said periscope height control means,
   means for substituting said variable depth view for said surface view,
   wave action simulating means for simulating the effect of waves washing over said periscope when surfaced,
   said means for substituting said variable depth view for said surface view comprising a movable mirror,
   solenoid means connected to said mirror for moving said mirror to a first position and to a second position on command,
   said means for varying said depth view being connected to said periscope height control means to increase the brightness of said varying depth view as said periscope height is increased,
   said mirror substituting said variable depth view for said surface view when in a first position.

2. The apparatus of claim 1, said means for generating a variable brightness depth view including a greenish transparent cube, a variable brightness lamp positioned to illuminate said cube, said mirror being arranged to bend the optical path of said periscope to view said cube when in said first position.

3. The apparatus of claim 2, said periscope height control comprising a first potentiometer, means connecting the output voltage of said first potentiometer to said variable lamp to increase the brightness of said lamp as said periscope height is increased,
   a surface height control comprising a second potentiometer,
   a comparator,
   first switch means connecting the output voltage of said first potentiometer to a first input of said potentiometer,
   second switch means connecting the output voltage of said second potentiometer to a second input of said comparator,
   a transistor connected to control said solenoid means,
   the output voltage of said comparator being connected to control said transistor,
   said comparator developing an output voltage when said first potentiometer output voltage is greater than said second potentiometer output voltage.

4. The apparatus of claim 3, said means for simulating wave action including a low frequency oscillator,
   a sea state control comprising a third potentiometer,
   a capacitor connecting the output voltage of said third potentiometer to said second switch, and
   means connecting the output voltage of said oscillator to supply said third potentiometer, whereby the varying output voltage is adjusted in said third potentiometer and supplied to said second input of said comparator to provide an adjustable varying voltage for generating said wave action.

5. The apparatus of claim 4, said first and second switches having a first and a second position,
   said switches when in said second position connecting computer means to said first and second inputs of said comparator whereby control of wave action and depth view simulation may be effected by said computer means.

* * * * *